March 5, 1963  R. C. GASMIRE  3,079,631
METHOD AND APPARATUS FOR FORMING HOLLOW PLASTIC ARTICLES
Filed March 30, 1960  4 Sheets-Sheet 1
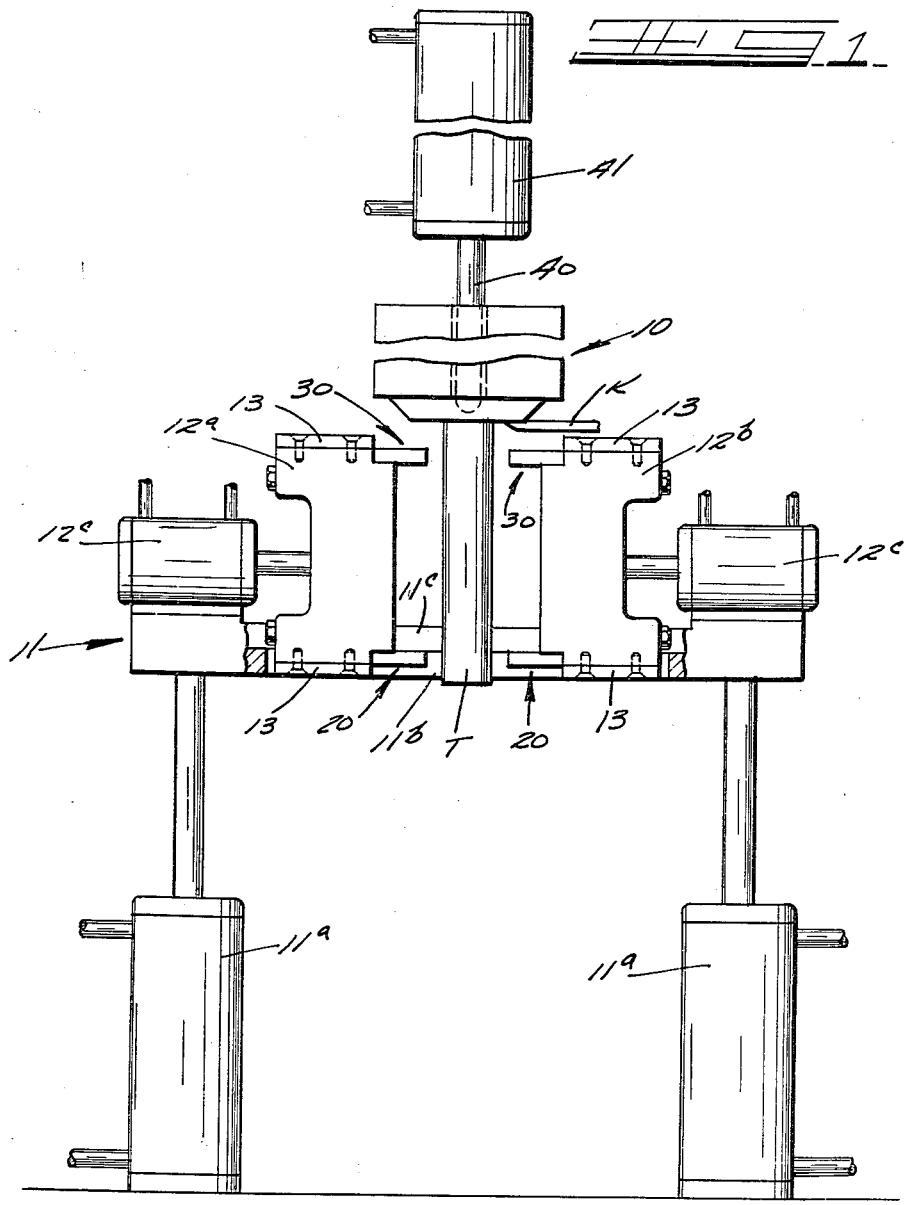
INVENTOR.
RICHARD C. GASMIRE
BY
J. R. NELSON &
W. A. SCHAICH
ATTORNEYS March 5, 1963 R. C. GASMIRE 3,079,631
METHOD AND APPARATUS FOR FORMING HOLLOW PLASTIC ARTICLES
Filed March 30, 1960 4 Sheets-Sheet 2
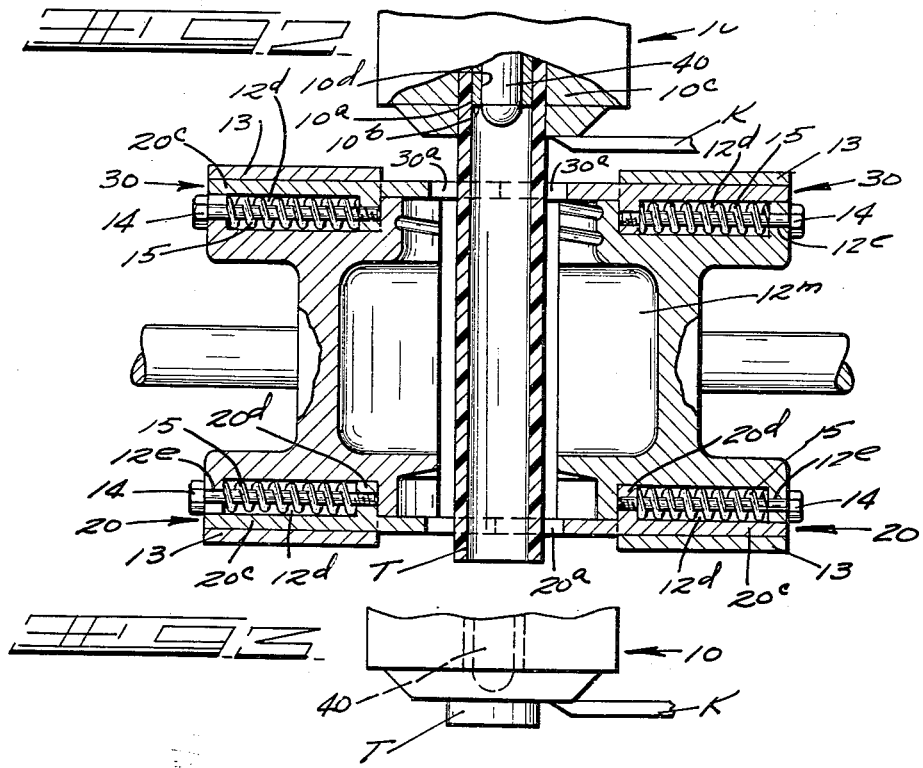
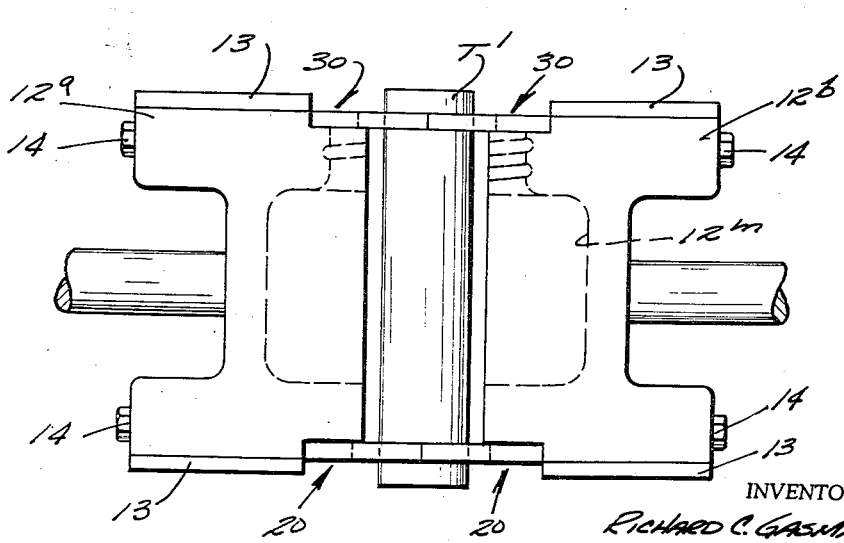
INVENTOR.
RICHARD C. GASMIRE
BY
J. R. NELSON &
W. A. SCHAICH
ATTORNEYS

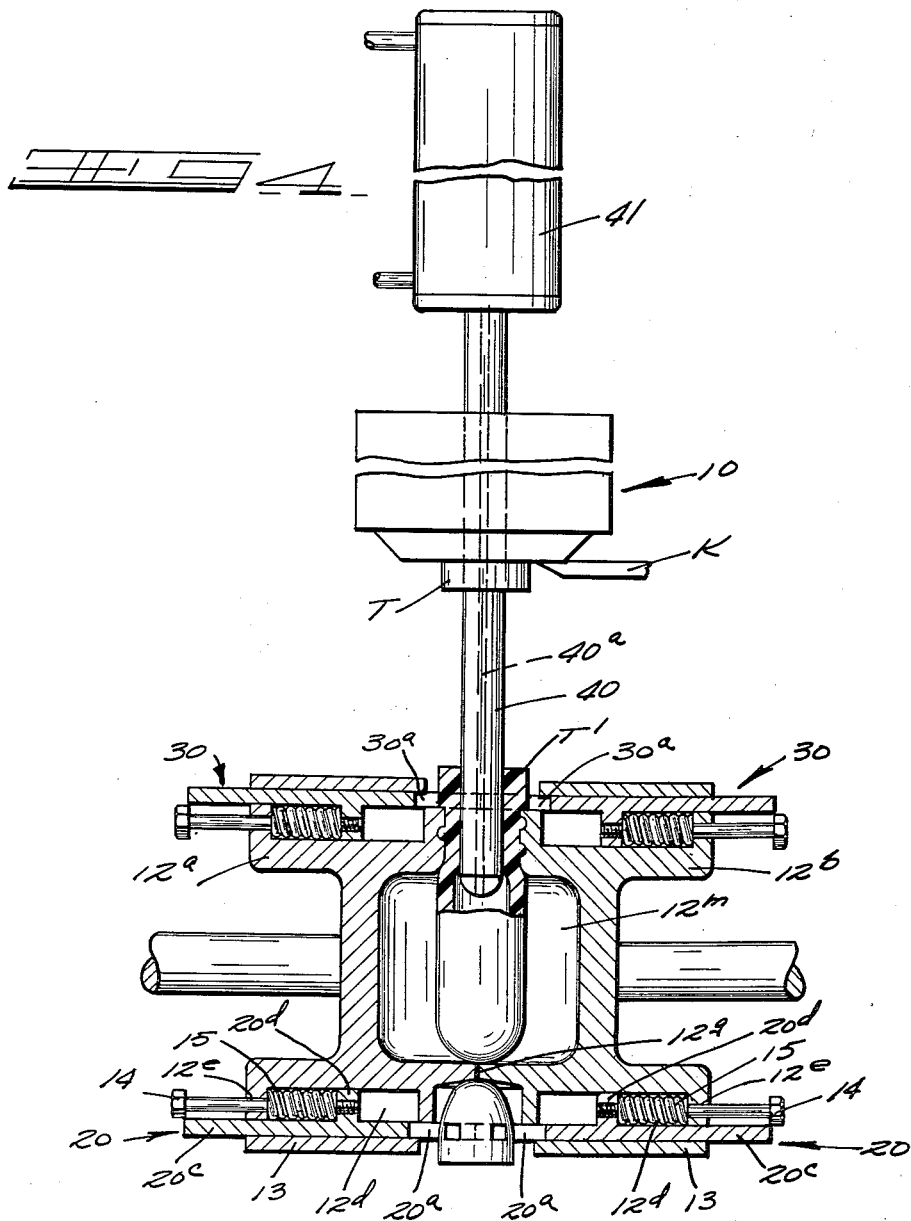

March 5, 1963 R. C. GASMIRE 3,079,631
METHOD AND APPARATUS FOR FORMING HOLLOW PLASTIC ARTICLES
Filed March 30, 1960 4 Sheets-Sheet 4
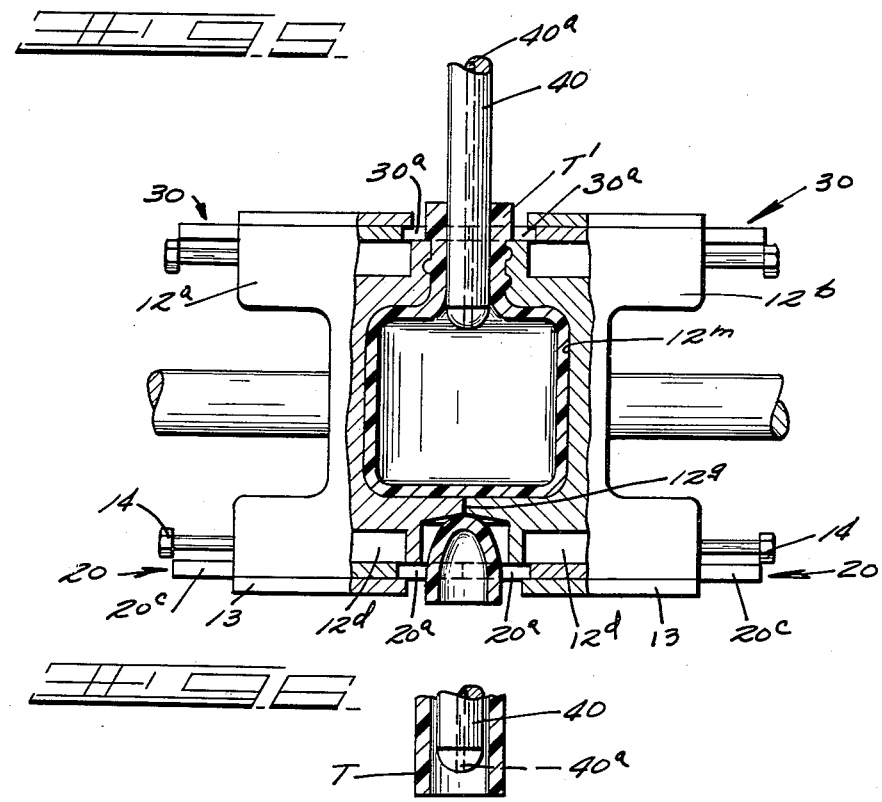
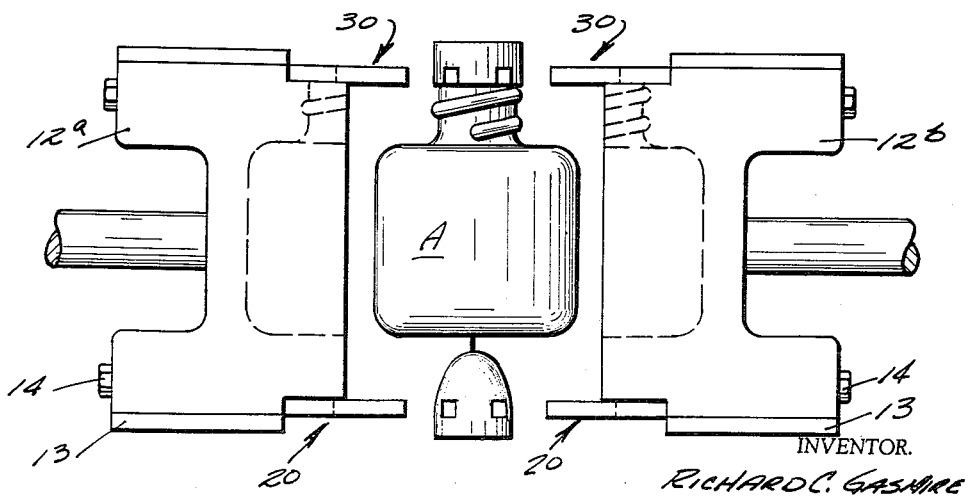
INVENTOR.
RICHARD C. GASMIRE
BY
J. R. NELSON &
W. A. SCHAICH
ATTORNEYS 3,079,631
METHOD AND APPARATUS FOR FORMING HOLLOW PLASTIC ARTICLES
Richard C. Gasmire, West Chicago, Ill., assignor to Owens-Illinois Glass Company, a corporation of Ohio
Filed Mar. 30, 1960, Ser. No. 18,543
8 Claims. (Cl. 18—5)

This invention relates to an improved method and apparatus for forming hollow plastic articles by blowing a heated tube of thermoplastic material in a partible mold.

There have been many processes heretofore proposed and utilized for forming hollow plastic articles by expansion of a heated tube of thermoplastic material. Among the most popular processes that have been utilized is a process based upon a continuously operating extruder having a horizontal annular orifice for vertically downwardly extruding a tubular formation of heated thermoplastic material. Such process has always suffered from an inherent disadvantage in that when the extruded tubular formation is heated to a temperature sufficient to permit subsequent expansion or molding thereof in a mold, the plastic material is so readily deformable that the weight of that portion of the tubular formation already extruded will effect an axial stretching of the portions of the tubular formations issuing from the extruder orifice. This effect becomes progressively worse as the wall thickness, diameter, or length of the extruded plastic tube is increased. Hence, when the desired length of tubular formation has been extruded, there will be a marked difference in the wall thickness and/or diameter of the upper portions of the extruded tubular formation as compared with the lower portions thereof.

When it is desired to utilize such a process for the blowing of plastic containers, such as bottles, it is most desirable to form the bottom portions of the bottles from the heavier wall thickness portions of the extruded tube formation. In other words, to produce a bottle having sufficient wall thickness in its lower portions to adequately support the bottle and its contents, it would be desirable to enclose the extruded vertically pendant tubular formation in a partible mold with the molding cavity disposed in an upright position, i.e., with the neck portions of the molding cavity enclosing the top portions of the extruded tubular formation.

This procedure necessarily means that the subsequent blowing or expansion of the tubular formation to conform to the mold cavity has to be accomplished through the insertion of a blowpipe into the top portions of the molding cavity. Heretofore, this procedure has required the extruder operation to be intermittent in character, inasmuch as the blowpipe must necessarily be inserted in the path of the oncoming tubular formation if the extruder is permitted to operate continuously.

Accordingly, it is an object of this invention to provide an improved method and apparatus for forming hollow plastic articles from vertically extruded thermoplastic tubing characterized by the blowing of the resultant article by a blowpipe applied to the upper portions of a severed length of the extruded tubular formation but in such manner as to avoid interference with the oncoming extruded tubular formation and thus permit continuous operation of the extruder and continuous production of the desired plastic articles.

A particular object of this invention is to provide a simplified method and apparatus for continuously producing plastic bottles from a continuously extruded vertical tubular formation of heated thermoplastic material wherein the upper portion of each successive length of the tubular plastic formation forms the neck portion of the resulting bottle.

Other objects and advantages of this invention will become apparent to those skilled in the art from the following detailed description thereof, taken in conjunction with the annexed sheets of drawings, on which, by way of preferred example only, is illustrated one embodiment of this invention.

On the drawings:

FIGURE 1 is a side elevational, schematic view of one form of apparatus capable of carrying out the method of this invention, with the components thereof in their starting positions of the cycle.

FIGURE 2 is an enlarged scale view, partly in vertical section, of the mold and extruder portion of the apparatus of FIGURE 1, showing these components in their respective positions for carrying out the second step of the process wherein a desired length of extruded tubing is grasped preliminary to being severed from the oncoming tubing.

FIGURE 3 is a view similar to FIGURE 2, but with no parts thereof in section, illustrating the next step of this invention wherein a severed length of tubing is moved axially to a remote position with respect to the extruder orifice.

FIGURE 4 is an enlarged scale, elevational view of the extruder and mold portions of the apparatus of FIGURE 1, illustrating the next step of this invention wherein the blowpipe is inserted in the severed length of tubing and the partible mold closed around such severed length and the inserted blowpipe.

FIGURE 5 is an enlarged scale elevational view of the molding portion of the apparatus of FIGURE 1, shown partly in section, and illustrating the next step of the invention wherein the severed length of tubing is expanded in the partible mold by fluid pressure to conform to the mold cavity.

FIGURE 6 is an elevational view of the molding elements of the apparatus of FIGURE 1 showing the last step of the invention wherein the segments of the partible mold are open and the blowpipe withdrawn to release the formed plastic article.

As shown on the drawings:

While this invention will be particularly described in connection with the formation of a hollow plastic container, such as a bottle, it should be distinctly understood that the principles thereof are equally applicable to the formation of any type of hollow article which can be blown from tubing in a partible mold. Hence, the invention may be readily applied to the manufacture of such items as toys, doll bodies, electrical fixtures, industrial components, etc. Referring now to FIGURES 1–6, there is schematically illustrated a plastic blowing machine of a type which is well known and currently offered on the market which has been modified to operate in accordance with the method of this invention. Thus an extruder 10 is provided which is capable of issuing a freely pendant vertical tube T of heated thermoplastic material. As best shown in FIGURE 2, the tube T is issued from an annular orifice 10a defined between two radially spaced, nested, annular orifice members 10b and 10c. The innermost orifice member 10b defines a hollow bore 10d through which an elongated blowpipe 40 is axially movable. A cylinder 41 suitably mounted above extruder 10 controls the axial movements of blowpipe 40. Suitable hydraulic connections (not shown) are provided to permit pressurized fluid to be supplied to the bore 40a of blowpipe 40.

A mold bed 11 is provided which is capable of vertical movement relative to the extruder orifice 10a. Preferably, mold bed 11 comprises a horizontal plate-like element which is supported at its outer ends by a pair of vertically disposed hydraulic cylinders 11a which effect upward and downward movements of the mold bed 11 as required to comply with the method of this invention. In the central portion of mold bed 11, an elongated slot 11b is provided which is of substantially greater width than the extruded thermoplastic tube T, so as to permit the free end of such tubular formation to freely pass through such slot, even though such tube may curve substantially out of axial alignment with the extrusion axis.

A pair of partible mold sections 12a and 12b are provided which, when closed, define a molding cavity 12m corresponding to the configuration of the plastic articles desired and here illustrated as comprising a conventional bottle with the neck portions of the bottle disposed upwardly. Mold sections 12a and 12b are laterally shiftable with respect to the mold bed 11 and may, if desired, be directly mounted on mold bed 11 for horizontal sliding movements with respect thereto. For example, each mold section 12a and 12b may slide between a pair of upstanding guide members 11e formed on the top surface of mold bed 11 while the bottom portion of each mold section projects into the central slot 11b. A pair of fluid-actuated cylinders 12c are respectively provided for the mold sections 12a and 12b and control the lateral shifting movements of such mold sections relative to mold bed 11.

The top and bottom faces of mold sections 12a and 12b are respectively utilized to mount two similar pairs of tube holding members 20 and 30. Such holding members are preferably constructed and mounted in the same manner as disclosed in my copending application, Serial No. 790,099, filed January 30, 1959, and assigned to the assignee of this invention. Thus, bottom holding member 20 has a rectangular stem portion 20c slidably received in the corresponding recess 12d and is retained in such recess by a cover plate 13 which is bolted to the corresponding mold section by suitable screws (not shown). An upwardly projecting lug 20d is formed on each holding member 20 which receives a threaded end of a spring guide bolt 14 which passes into the mold recess 12d through a suitable aperture 12e in the end wall thereof. A spring 15 is mounted on the guide bolt 14 and functions to bias the corresponding tube holding member 20 to a forwardly projecting position relative to the corresponding mold segment.

The upper pair of tube holding members 30 are respectively mounted on the top surfaces of the mold sections 12a and 12b in an identical manner as heretofore described for the bottom holding members 20.

Both the top and bottom pairs of tube holding members respectively define tube engaging notches 20a and 30a in their opposed vertical surfaces, which notches, when the opposed holding members are in abutment, cooperate to engage and vertically support those portions of the extruded thermoplastic tube T which are located between the top and bottom pairs of holding members.

Lastly, a tube severing knife K is provided which is spaced below or closely adjacent to the extrusion orifice 10a. A suitable hydraulic cylinder (not shown) is provided for rapidly horizontally reciprocating the knife K to effect severance of the thermoplastic tube T in such manner as to leave both of the severed ends of the tube open.

The operation of the aforedescribed apparatus, in accordance with the method of this invention, proceeds as follows. In the starting position of the machine cycle, the various elements of the apparatus occupy the positions shown in FIGURE 1. Thus the mold bed 11 is in its elevated position with respect to the extruder 10, the mold sections 12a and 12b are in their open positions, and a length of extruded tubing T has been produced by extruder 10 and projects downwardly between the opposed open mold sections 12a and 12b. The blowpipe 40 is in its upper retracted position and held there by its operating cylinder 41. It is important to remember that the extruder 10 operates continuously to produce a tubular formation of heated plastic.

In the next step in the method of this invention, the mold sections 12a and 12b are respectively actuated by their corresponding cylinders 12c to move inwardly relative to each other and the extruded tube T to the partially closed position indicated in FIGURE 2, wherein both the top and bottom pairs of tube holding members 20 and 30 engage the extruded tube T in their tube holding notches 20a and 30a. Since the notches are of tapered configuration, any deviation of the extruded tube T from a position of exact axial alignment will not interfere with the engagement of the tube holding members with the tube, and the tapered notches 20a and 30a will serve to center the tube T relative to the molding cavity 12m.

In the next step of the method of this invention illustrated in FIGURE 3, the knife K has been actuated to sever the length of tubing held by the tube holding members 20 and 30. Such severed length of tubing is hereafter referred to as T'. Immediately subsequent to the severing operation, or concurrently therewith, the mold bed cylinders 11a are actuated to move the mold bed 11 downwardly, thus carrying with it the mold sections 12a and 12b and the severed length of tubing T' which is held and supported by the top and bottom pairs of tube holding members 20 and 30, respectively. The downward movement of the mold bed 11 is accomplished at a rate substantially greater than the rate of extrusion so that the severed ends of the tubular formation are spaced apart a substantial distance when the mold bed 11 reaches its lowermost position, as indicated in FIGURE 3.

At this point, as illustrated in FIGURE 4, the blowpipe cylinder 41 is energized to drive the blowpipe 40 downwardly through the bore 10d of the inner orifice member 10c so that the bottom end of the blowpipe 40 enters the top open end of the severed length of tubing T'. Immediately thereafter, the mold section cylinders 12c are respectively actuated to shift the mold sections 12a and 12b to their fully closed positions, illustrated in FIGURE 4, wherein they surround the severed length of tubing T' and compress the tubing T' onto the inserted end of the blowpipe 40. At the bottom portion of the mold cavity 12m, pinching edges 12g are provided which pinch together and seal the bottom end portion of the severed length of tubing T'.

As illustrated in FIGURE 5, pressurized fluid is then introduced through the bore 40a of blowpipe 40 to expand the severed length of tubing T' to conform to the mold cavity 12m. It will be noted that the upper portions of the severed length of tubing T' thus form the neck portions of the resulting bottle so that any inequality in wall thickness of the severed length of tubing T' due to the inherent stretching of such tubing by its own weight results in the heavier portions of such tubing forming the bottom portions of the bottle.

Finally, as illustrated in FIGURE 6, after the formed plastic article is sufficiently cooled to maintain its configuration, the mold sections 12a and 12b are moved outwardly to their open positions and concurrently therewith, the blowpipe 40 is retracted upwardly to its initial position, thus releasing the formed article A, which can be readily blown out of the apparatus by a laterally directed jet of air or manually removed therefrom. The mold bed 11 is then moved upwardly by its cylinders 11a to restore all of the elements of the apparatus to the starting position of the cycle indicated in FIGURE 1. In the meantime, a new length of tubing T has been extruded by the continuously operating extruder 10 and the apparatus is ready to immediately form the next article.

Accordingly, the aforedescribed method and apparatus provides an unusually simple and efficient arrangement for forming hollow plastic articles from continuously extruded vertically pendant tubing. It permits the tubing to be blown into the desired configuration by fluid pressure applied through the upper portions of the tubing, yet does not interfere with the continuity of the extrusion or the continuous operation of the molding apparatus.

This application is a continuation-in-part of my earlier filed application, now abandoned, Serial No. 801,581, filed March 24, 1959, and assigned to the assignee of the present application.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. Apparatus for continuously forming hollow plastic articles comprising a continuously operating thermoplastic extruder having a pair of nested elements defining a downwardly directed, annular extrusion orifice, whereby vertically pendant heated thermoplastic tubing is continually issued from said orifice, the innermost nested element having an axial bore therethrough, means for severing a length of said issued tubing in such manner as to leave the severed ends open, means for axially shifting the severed length of tubing to a blowing position, thereby spacing apart the severed ends, an elongated blowpipe axially movable in said bore of said innermost nested element, means for axially shifting said blowpipe between an upper retracted position above said severing means and a lower blowing position wherein the end of said blowpipe is inserted in the severed length of tubing at said blowing position, a partible mold, means for closing said partible mold about said severed length of tubing and said blowpipe at said blowing position, and means for supplying pressurized fluid through said blowpipe to expand the severed length of tubing to conform to the cavity of said partible mold.

2. Apparatus for continuously forming hollow plastic articles comprising a continuously operating thermoplastic extruder having a pair of nested elements defining a downwardly directed, annular extrusion orifice, whereby a vertically pendant heated thermoplastic tube is continually issued from said orifice, the innermost nested element having an axial bore therethrough, a partible mold having horizontally shiftable segments disposed on opposite sides of said tube and movable between an open position horizontally remote from the tube and a closed position enclosing the tube, a pair of tube holding units respectively mounted on the top and bottom portions of said partible mold, each of said tube holding units having means thereon for grasping said tube when said mold segments are moved toward said closed position, means for severing said tube above the uppermost tube holding unit after said tube is engaged by said tube holding units, means for moving said partible mold axially downwardly with respect to the orifice to a blowing position, thereby spacing apart the severed tube ends, an elongated blowpipe axially movable in said bore of said innermost nested element, means for axially shifting said blowpipe between an upper retracted position above said severing means and a lower blowing position wherein the end of said blowpipe is inserted in the severed length of tube at said blowing position, means for closing said partible mold about said severed length of tube and said blowpipe at said blowing position, and means for supplying pressurized fluid through said blowpipe to expand the severed length of tube to conform to the cavity of said partible mold.

3. In an apparatus for continuously forming hollow plastic articles including a continuously operating thermoplastic extruder having a pair of nested elements defining a downwardly directed, annular extrusion orifice, a partible blow mold having horizontally shiftable segments disposed on opposite sides of a tube issued from said orifice and movable between an open position and a closed position enclosing a portion of the tube, a tube holding unit having means thereon for grasping said tube adjacent the orifice, means for moving said holding unit from a position adjacent the orifice axially downwardly with respect to the orifice to a blowing position at which the blow mold is closed thereon, the improvements of the innermost of said nested elements having an axial bore therein, an elongated blowpipe axially movable in said bore of said innermost nested element, means for axially shifting said blowpipe between an upper retracted position at which the end thereof is positioned adjacent the orifice and a lower blowing position at which the end of said blowpipe is positioned in the tube at said blowing position, and means for supplying pressurized fluid through said blowpipe to expand the portion of the tube enclosed in the blow mold.

4. In a method of forming hollow plastic articles from a continuously extruded vertically pendant tube of heated thermoplastic material issued downwardly from an annular orifice, the inner member defining said orifice having an axial bore, the steps of grasping a desired length of said tube in proximity to said orifice, separating said desired length of said tube from material in the orifice so as to leave the ends of the tube open, inserting a blowpipe downwardly through said orifice member bore concentrically of the oncoming next-formed tube integral with material in the orifice and into the top open end of said length of tube, compression-forming one portion of said article from that portion of said length of tube surrounding the inserted end of said blowpipe, introducing pressurized fluid through said blowpipe into the remainder of said length of tube to expand the same to the configuration of the remainder of the article and retracting the blow pipe upwardly through the vertically pendant tube of heated thermoplastic material into said orifice member bore.

5. In an apparatus for continuously forming hollow plastic articles, a continuously operating thermoplastic extruder having a pair of nested elements defining a downwardly directed, annular extrusion orifice, whereby vertically pendant heated thermoplastic tubing is continually issued from said orifice, the innermost nested element having an axial bore therethrough, means for separating a length of said issued tubing from material in the orifice so as to leave open the ends of the tubing length, means for axially shifting the severed length of tubing to a blowing position, an elongated blowpipe axially movable in said bore of said innermost nested element, and means for axially shifting said blowpipe between an upper retracted position at the orifice and a lower blowing position wherein the end of said blowpipe is located in the severed length of tubing at said blowing position.

6. In an apparatus for continuously forming hollow plastic article having a continuously operating thermoplastic extruder having a downwardly directed, annular extrusion orifice from which vertically pendant heated thermoplastic tubing is continually issued from said orifice, means for separating a length of said issued tubing from material in the orifice so as to leave the ends of the tubing length open, and means for axially shifting the length of tubing to a blowing position at which a portion of the tube is enclosed in a partible blow mold, the improvements of means at the orifice defining a vertical passage concentric with the orifice and located centrally thereof, an elongated blowpipe axially movable in said orifice passage, power means for axially shifting said blowpipe between an upper retracted position at the orifice and a lower blowing poistion at which the end of said blowpipe is located in the severed length of tubing at said blowing position, and means for supplying pressurized fluid through said blowpipe when the blow pipe is in its lower blowing position.

7. In an apparatus for making hollow plastic articles from separate and consecutive lengths of plastic tubing extruded downwardly from an annular orifice by the enclosure of a portion of each successive tube length in a partible blow mold at a blowing station remote from the orifice, the improvements which comprise an inner orifice-defining mandrel having a vertical bore, a vertically reciprocable blowpipe in said bore, means for reciprocating said blowpipe between a retracted position at which the end of said pipe is adjacent the orifice and an extended position at which the end of the blowpipe is in the upper end of the tube length at the blowing station, means for engaging each successive tube length as it issues from the orifice and transferring each such length to the blowing station, and means for introducing blow air through the blowpipe and into the tube length enclosed in the mold at the blowing station.

8. In a method of forming hollow plastic articles from a tube of heated thermoplastic material continuously extruded from an annular orifice in surrounding concentric relationship to a linearly displaceable blow pipe, the steps of grasping a desired length of the freely dependent tube in proximity to said orifice, severing said desired length of said tube from the remainder of said extruded tube, moving the severed tube length axially to a blow molding position, linearly displacing the blow pipe beyond the orifice and axially through the unsevered tube length issuing from the orifice so that the blow pipe end is disposed within the trailing open end of said severed tube length at said blow molding position, closing a pair of blow molds on at least a portion of said severed length at said blow molding position, expanding the mold-enclosed portion of said length by fluid pressure transmitted by the blow pipe, and linearly retracting the blow pipe from the expanded severed length and through said unsevered tube length to condition said unsevered tube length for the next successive grasping step.

References Cited in the file of this patent
UNITED STATES PATENTS

| | | |
|---|---|---|
| 2,783,503 | Sherman | Mar. 5, 1957 |
| 2,861,295 | Hagen et al. | Nov. 25, 1958 |
| 2,898,633 | Burch | Aug. 11, 1959 |
| 2,978,745 | Langecker | Apr. 11, 1961 |

FOREIGN PATENTS

| | | |
|---|---|---|
| 744,927 | Great Britain | Feb. 15, 1956 |